United States Patent
Nair et al.

(10) Patent No.: US 12,265,463 B2
(45) Date of Patent: Apr. 1, 2025

(54) SOFTWARE PROGRAM ERROR TESTING FOR AUTONOMOUS SYSTEMS AND APPLICATIONS

(71) Applicant: NVIDIA Corporation, Santa Clara, CA (US)

(72) Inventors: Saumya Nair, Bangalore (IN); Yogesh Kini, Bangalore (IN); Ashutosh Jain, Nellore (IN); Neeraja Gubba, Bangalore (IN)

(73) Assignee: NVIDIA CORPORATION, Santa Clara, CA (US)

( * ) Notice: Subject to any disclaimer, the term of this patent is extended or adjusted under 35 U.S.C. 154(b) by 66 days.

(21) Appl. No.: 18/152,666

(22) Filed: Jan. 10, 2023

(65) Prior Publication Data

US 2024/0232050 A1  Jul. 11, 2024

(51) Int. Cl.
| | | |
|---|---|---|
| *G06F 11/32* | (2006.01) | |
| *G06F 9/54* | (2006.01) | |
| *G06F 11/36* | (2025.01) | |
| *G06F 11/362* | (2025.01) | |
| *G06F 11/3668* | (2025.01) | |
| G06F 11/07 | (2006.01) | |
| G06F 11/22 | (2006.01) | |
| G06F 11/263 | (2006.01) | |
| G06F 11/34 | (2006.01) | |

(52) U.S. Cl.
CPC ...... *G06F 11/3644* (2013.01); *G06F 11/3664* (2013.01); *G06F 11/3688* (2013.01); *G06F 11/0793* (2013.01); *G06F 11/2273* (2013.01); *G06F 11/263* (2013.01); *G06F 11/3466* (2013.01); *G06F 11/3692* (2013.01)

(58) Field of Classification Search
CPC ............ G06F 11/3644; G06F 11/3664; G06F 11/3688; G06F 11/263; G06F 11/2273; G06F 11/3466; G06F 11/3692; G06F 11/0793

See application file for complete search history.

(56) References Cited

U.S. PATENT DOCUMENTS

| | | | |
|---|---|---|---|
| 9,678,816 B2 * | 6/2017 | Rugina | ............... G06F 11/0793 |
| 11,301,350 B1 * | 4/2022 | Byrne | ................... G06F 11/263 |

(Continued)

OTHER PUBLICATIONS

Eviatar Khen et al., LgDb 2.0: Using Lguest for kernel profiling, code coverage and simulation, Jul. 7-10, 2013, [Retrieved on Nov. 13, 2024]. Retrieved from the internet: <URL: https://ieeexplore.ieee.org/stamp/stamp.jsp?tp=&arnumber=6595745> 8 Pages (1-8) (Year: 2013).*

*Primary Examiner* — Anibal Rivera
(74) *Attorney, Agent, or Firm* — Maschoff Brennan

(57) ABSTRACT

One or more embodiments relate to executing a software testing tool to identify function calls—internal and/or external—of software code and their corresponding errors. Once identified-such as during an information gathering operation-the error codes may be returned in place of actual outputs of the function during testing, and the downstream processing of the software as a result of the errors may be evaluated. As such, an automatic software testing tool may be implemented that not only identifies functions calls and corresponding errors, but also evaluates performance of the software in view of the various different error types associated with the function calls.

17 Claims, 10 Drawing Sheets

(56) References Cited

U.S. PATENT DOCUMENTS

| | | | |
|---|---|---|---|
| 11,973,787 B2* | 4/2024 | Compagna | G06F 11/3688 |
| 2004/0168106 A1* | 8/2004 | Cherny | G06F 11/3672 |
| | | | 714/E11.207 |
| 2004/0243882 A1* | 12/2004 | Zhou | G06F 11/36 |
| | | | 714/38.1 |
| 2012/0216078 A1* | 8/2012 | Albot | G06F 11/3688 |
| | | | 714/38.1 |
| 2012/0222014 A1* | 8/2012 | Peretz | G06F 11/3684 |
| | | | 717/125 |
| 2012/0284695 A1* | 11/2012 | Olsa | G06F 11/3696 |
| | | | 717/124 |
| 2014/0351797 A1* | 11/2014 | Kalayci | G06F 11/3624 |
| | | | 717/127 |
| 2017/0132419 A1* | 5/2017 | Gupta | G06F 8/65 |
| 2022/0100599 A1* | 3/2022 | Abuelela | H04L 41/5019 |

* cited by examiner

SOFTWARE PROGRAM ERROR TESTING FOR AUTONOMOUS SYSTEMS AND APPLICATIONS

BACKGROUND

Software programs may include many different function calls. Function calls may generally include submitting information to a software function and having the software function return information based on the submitted information. By way of example and not limitation, the submitted information may include requests for certain information, input data for the software function to use to produce a certain output based on programmed operations, etc. Additionally or alternatively, the returned information may be, by way of example and not limitation, requested information or an output of the called function.

The function calls may be external calls that may send to and/or request information from functions that are external to the software programs, such as those facilitated via application program interfaces (API's). Additionally or alternatively, the function calls may be internal calls that may send to and/or request information from functions that are internal to the software programs. In some instances, such as with external function calls, the operations performed by the called function may not be known by the software program.

In some instances, a function call may result in the called function returning an error to the software program. Further, the testing of software programs may include testing to see how the software programs handle returned errors. For example, testing to see if the software programs are able to continue performing certain operations despite receiving a returned error. Such testing may be required in some software programs, such as software programs used to control the operations of ego-machines—e.g., software programs that control autonomous driving operations of vehicles. However, as software programs increase in size and complexity, the number of function calls also increases and the testing of how the software programs handle return errors also increases in complexity.

For example, some traditional approaches to error handling testing of software programs may include a tool automatically generating tests, but without the tool systematically identifying the different function calls and possible return errors of the different function calls. As such, error handling in such circumstances may only be tested in which called functions actually return errors, which may be inconsistent. Such techniques thus may not provide a comprehensive result related to testing the error handling abilities of the tested code.

Further, other testing techniques may include users manually programming code stubs associated with each instance in which different functions may be called. However, such an approach may be extremely labor intensive as it may require stubs to be injected at each function call, even if the same function is being called multiple times. Further, such an approach may become even more labor intensive as code is modified by moving function calls such that stubs may need to be moved and modified as well. Such problems are exacerbated as the code of software programs increases in size and complexity.

SUMMARY

According to one or more embodiments of the present disclosure, a software testing tool may be configured to generate tests to test return errors associated with function calls. In particular, the software testing tool may be configured to perform an information gathering test of code of a software program. Additionally, the information gathering test may be configured to gather information about the code. For example, the software testing tool may be configured to identify, during the information gathering test, one or more functions (e.g., external and/or internal functions) that may be called by the code.

Additionally or alternatively, the software testing tool may be configured to identify the return types of the identified functions. In these or other embodiments, the software testing tool may be configured to identify one or more respective return errors that may be returned by the called functions.

In some embodiments, the software testing tool may be configured to perform one or more error-injection tests after the information gathering test. The error-injection tests may be based on the identified function calls and the respective return errors of the identified function calls. For example, during an error-injection test that is configured as an error-injection test, the software testing tool may be configured to inject a particular return error associated with a particular function that is invoked in the code.

In some embodiments, the software testing tool may be configured to generate and execute respective error-injection tests for one or more respective identified function calls and for one or more respective return errors of the respective function calls. In these or other embodiments, the software testing tool may be configured to generate and execute respective error-injection tests for each identified function call and/or each return error associated with each identified function call of a set of identified function calls. In some embodiments, the set of identified function calls may include all of the identified function calls or a subset of the identified function calls.

The embodiments of the present disclosure may help improve error testing of software programs, and thus may also help improve the software programs themselves. For example, one or more embodiments of the present disclosure may allow a single error stub to be generated for a single function, regardless of how many times that function may be called. Additionally or alternatively, one or more embodiments may allow movement of the function calls in the code without requiring any changes to the error stubs and/or error stub placement. Further, as discussed in further detail in the present disclosure, the embodiments of the present disclosure may provide more comprehensive error handling testing than other automated techniques and may be less labor intensive than manual approaches.

BRIEF DESCRIPTION OF THE DRAWINGS

The present systems and methods for software program error testing are described in detail in the present disclosure with reference to the attached drawing figures, wherein.

DETAILED DESCRIPTION

Figure 1:
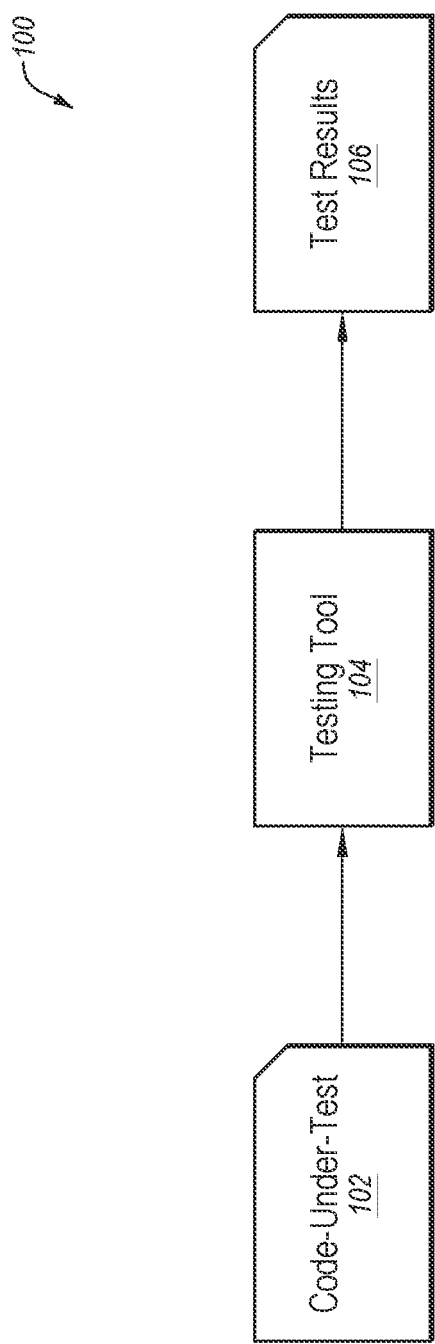
FIG. 1 is a diagram representing an example environment related to software program error testing, in accordance with some embodiments of the present disclosure.

Systems and methods related to error handling testing of software programs are disclosed in the present disclosure. For example, one or more embodiments may relate to generating and/or executing tests that relate to testing how software programs may behave in response to one or more software functions ("functions") called by the software programs returning an error value when called. For instance, as described in detail in the present disclosure, a software testing tool may be configured to identify one or more functions that may be called by code of the software program. Additionally or alternatively, the software testing tool may be configured to generate and/or perform one or more error-injection tests associated with the identified functions. The error-injection tests may include tests in which an identified function is simulated as returning an error value in response to being called.

One or more of the embodiments disclosed herein may relate to the testing of software programs that may be executed by ego-machines, which may include any applicable machine or system that is capable of performing one or more autonomous or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous vehicle 400 (alternatively referred to herein as "vehicle 400" or "ego-machine 400") described with respect to FIGS. 4A-4D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for hosting real-time streaming applications, systems for presenting one or more of virtual reality content, augmented reality content, or mixed reality content, systems for performing light transport simulation, systems for performing collaborative content creation for 3D assets, systems implemented at least partially using cloud computing resources, and/or other types of systems.

The embodiments of the present disclosure may help improve error testing of software programs, and thus may also help improve the software programs themselves as well as the downstream processing of outputs of the software programs. For example, some traditional approaches to error handling testing of software programs may include a tool automatically generating tests (e.g., LDRA, Vectorcast, Cantana, etc.), but without the tool systematically identifying the different function calls and possible return errors of the different function calls. As such, error handling in such circumstances may only be tested in which called functions actually return errors, which may be inconsistent. As such, such techniques may not provide a comprehensive result related to testing the error handling abilities of the tested code. Additionally or alternatively, automatic stub creation—while low on maintenance—may perform static analysis of the function under test. The time taken to create automatic stubs and to run them on a per change basis may be impractical. Additionally or alternatively, automatic execution may suffer from other limitations such as, for example, limitations with static analysis such as with respect to function pointers as tools may not be capable of statically determining dynamic execution of one or more error tests.

Further, other testing techniques may include users manually programming code stubs (or method stubs) to provide return error values at each instance in which different functions may be called. However, such an approach may be extremely labor intensive as it may require stubs to be injected at each function call, even if the same function is being called multiple times. Further, such an approach may become even more labor intensive as code is modified by moving function calls such that stubs may need to be moved and modified as well. Such problems are exacerbated as the code of software programs becomes increasingly large and more complex.

By contrast, and as discussed in further detail below, the embodiments of the present disclosure may provide a middle ground for a highly maintainable solution to stub functions and to write a number of test cases that can be safety certified. Additionally or alternatively, some embodiments described herein may provide more comprehensive error handling testing than other automated techniques and may be less labor intensive than manual approaches. For example, one or more embodiments of the present disclosure may allow a single stub to be generated for a single function, regardless of how many times that function may be called. Additionally or alternatively, one or more embodiments may allow for moving of the function calls in the code without requiring any changes to the stubs and/or stub placement.

In some embodiments, the tool may provide a macro to be inserted into the function body of internal functions to be stubbed. In these and other embodiments, the macro may contain information about the return type and the possible return values. In some embodiments, the information may decrease the maintenance of generating stubs and may increase a resiliency of the test to frequent code changes as the stubs remain in sync with the code. Because the possible return values may be manually written, the tests generated may be more meaningful. As a result, some embodiments of the present disclosure may reduce an amount of computing power and/or resources for software components to achieve up to 100% code coverage for error-handling testing.

As such, embodiments of the present disclosure relate to a light-weight fault injection framework that may serve as a middle-ground between manual and automatic ways of stub creation and writing/generating tests. The testing tool may run the tests in two phases—a monitoring phase and a fault injection phase. In the monitoring phase (e.g., where no fault is injected), the software tool records the functions which must be fault injected or are available for fault injection. In the fault injection phase, the software tool replays the same test and injects, e.g., one fault at a time in a separate process.

To solve drawbacks of prior approaches with respect to maintaining a large number of stubs, the software tool provides a macro that may be inserted into the function body of internal functions to be stubbed. The macro may contain information about the return type and the possible return values. This allows the stubs to be low on maintenance and also for the stub to not be tied to the actual test. Also, this process is resilient to frequent code changes as the stubs remain in sync with the code. Since the possible return values may be manually written, the tests generated may be more meaningful. In embodiments, some or all external library calls are manually mocked once and not per test.

The software tool may include record and replay mechanics that generate test cases dynamically (unlike static analysis) and offer lesser initial creation time for the tests. For example, a user may start by writing an initial test case which runs to successful completion. During the information gathering phase when such a test case is executed, the tool may record some or all of the invocations of stubbed functions with the help of the in-line macro. At the end of the information gathering phase, the tool may then have a complete list of all invocations. As used throughout the disclosure, the information gathering phase may additionally be referred to as "monitoring" or as "a monitoring phase." During the fault injection phase, the tool re-runs the same test cases—sometimes over and over again—by injecting one fault at a time. The software tool may then verify the behavior of the function under test. As used throughout this disclosure, the fault injection phase may also be referred to as "an error-injection test" or as "error-injection."

As such, with a single information gathering phase and a stub per function, the same test may be used to cover a large number of error paths. In addition, the test cases written are independent of what faults would be injected, and the tests may be written for unit interfaces (so are few in number) and changes internal to the unit may not affect the test case.

Further, injecting faults in a separate process provides isolation and verifies error propagation for every occurrence of faults. In this way, the software tool reduces the number of test cases significantly by reusing successful test cases, requires a fewer number of stubs which are resilient to code changes, and also dynamically generates tests. This all results in a reduction in the time taken to write, execute, and maintain the tests.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Now referring to FIG. 1, FIG. 1 is a diagram representing an example environment 100 related to software program error testing, arranged in accordance with at least one embodiment described in the present disclosure. The environment 100 may include a testing tool 104 that may be configured to perform operations on a code-under-test 102 and to perform operations on the code-under-test 102 to generate test results 106.

The code-under-test 102 may include electronic data, such as, for example, a software program, source code of the software program, libraries, applications, scripts, or other logic or instructions for execution by a processing device. In some embodiments, the code-under-test 102 may include a complete instance of the software program. Additionally or alternatively, the code-under-test 102 may include a portion of the software program. The code-under-test 102 may be written in any suitable type of computer language that may be used for the software program.

In some embodiments, the code-under-test 102 may include one or more functions and one or more corresponding function calls corresponding to one or more operations that the code-under-test 102 is configured to cause performance of. In some embodiments, the function calls may be external calls that may send to and/or request information from functions that are external to the code-under-test 102, such as those facilitated via application program interfaces (API's). Additionally or alternatively, the function calls may be internal calls that may send to and/or request information from functions that are internal to the code-under-test 102. In some instances, such as with external function calls, the operations performed by the called function may not be accessible by the code-under-test 102. In some embodiments, the function calls may be represented using function pointers.

In some embodiments, the code-under-test 102 may include one or more function calls that may be configured to provide input to corresponding functions and receive outputs from the called functions. For example, the code-under-test 102 may provide, via a function call corresponding to a particular function, data, values, variables, and/or other information used by the particular function to perform operations. In some embodiments, the particular function in the code-under-test 102 may receive the input provided by the code-under-test 102 and may additionally be configured to perform operations on the input to generate an output. In these or other embodiments, the function calls may cause the function to return the generated output, which then may be used by the code-under-test 102—e.g., as input to other operations, as a provided output, etc.

For example, in the example of an autonomous vehicle or machine, a called function may receive input from the code-under-test 102 that may include data from a speed sensor of the autonomous vehicle or machine. Continuing the example, the function may be configured to perform operations on the input from the speed sensor such that the data from the speed sensor in the vehicle may translate to a lateral vehicle speed as a generated output. Further continuing the example, the function may be configured to provide the generated output back to the code-under-test 102. In some embodiments, the output provided by the function may be used as an input by the code-under-test 102 for other operations or may be returned as an output by the code-under-test 102.

In some embodiments, the function calls may include one or more calls to an internal function and/or one or more calls to an external function. In the present disclosure, reference to an "internal function" may refer generally to a unit of code configured to receive one or more inputs and produce one or more outputs where the unit of code may be defined by one or more lines of code in the code-under-test 102. By contrast, in the present disclosure, reference to an "external function" may refer generally to a unit of code configured to receive one or more inputs and produce one or more outputs where the unit of code may be defined outside of the code-under-test 102. For example, the code-under-test 102 may include an external function B that may receive one or more inputs and provide one or more outputs and where the external function B may be defined outside of the code-under-test 102. Continuing the example, the code-under-test 102 may provide the external function B with one or more inputs and request one or more outputs from the external function B where the exchange of information may be facilitated via one or more APIs.

In some embodiments, a function call may result in the called function returning an error to the software program. In some embodiments, the returned error may be a consequence of an error occurring in the operations performed by the function with the input from the code-under-test 102. In some embodiments, the error may occur from incomplete, incorrect, corrupt, or otherwise bad input information from the code-under-test 102. In these and other embodiments, the error that may be returned by the function to the code-under-test 102 may affect a behavior of the code-under-test 102. For example, certain return errors provided to the code-under-test 102 may initiate a stop or pause in any further action from the code-under-test 102. As another example, certain return errors provided to the code-under-test 102 may not pause or stop further action from the code-under-test 102. Additionally or alternatively, certain provided errors may initiate execution of different sections of the code-under-test 102 than may not have been executed without the provided return error.

In these and other embodiments, errors may be provided to the code-under-test 102 as return error values which may include one or more values that may represent one or more encountered errors. In some embodiments, one return error value may represent multiple encountered errors. Additionally or alternatively, one return error value may represent one encountered error. In these and other embodiments, functions may return multiple return values to the code-under-test 102 that may represent multiple errors that the function may have encountered. In some embodiments, as used in this disclosure, a return error value may include any number of data types that may convey error information to the code-under-test 102 (e.g., integer, float, Boolean, string, char, and/or other data types that may convey error information to the code-under-test 102). In some embodiments as described in the present disclosure, a behavior of the code-under-test 102 in response to the one or more return error values may be monitored and/or tested.

In some embodiments, the code-under-test 102 may include one or more stub codes corresponding to the one or more functions. In these and other embodiments in the present disclosure, the one or more stub codes may include one or more lines of code configured to be executed instead of (e.g., in place of) a corresponding function during testing. For example, in some instances, in response to encountering a function call corresponding to a particular function, the stub code corresponding to the particular function may be executed rather than causing the function to be called and executed. In some embodiments, the one or more stub codes may be configured to receive one or more inputs from the code-under-test 102 and/or the testing tool 104. Additionally or alternatively, the stub code may be configured to provide one or more outputs based on the one or more inputs received, and/or based on being "called" or "run" even if no input is received.

In some embodiments, the one or more stub codes and/or macros may be configured to provide one or more return error values to the code-under-test 102 based at least on the inputs received. In these and other embodiments, the one or more stub code(s) and/or macro(s) configured to provide one or more error values to the code-under-test 102 may accordingly operate as and be referred to generally as "error-injection code" in such contexts. For example, the code-under-test 102 may include a first function call that may correspond to a first function in which the first function has a first return error value. In addition, the code-under-test 102 may include a first error-injection code that corresponds to the first function. Continuing the example, the testing tool 104 may provide an input to the code-under-test 102 such that, instead of calling and executing the first function, the first error-injection code corresponding to the first function may be executed. Further continuing the example, the first error-injection code may receive the input from the testing tool 104 and may provide an output that may include the first return error value to the code-under-test 102. In some embodiments, the error-injection code may be configured to provide the generated output to the code-under-test 102, as further described and illustrated in embodiments of the present disclosure.

In some embodiments, the code-under-test 102 may include one or more macroinstructions ("macros") that may include information corresponding to an internal function—such as, for example, the one or more return error values. In these and other embodiments, the term "macros" may include one or more lines of code that may indicate a number of different return types of internal functions. By way of example and not limitation, the code-under-test 102 may include a number of lines of code that may define an example internal function "A" where the example function A may include a number of example return error values, "X," "Y," and "Z." Continuing the example, return error values X, Y, and Z may be included in the macro such that the testing tool 104 may be configured to automatically identify the example return error values X, Y, and Z.

In some embodiments, the code-under-test 102 may be tested with different return errors provided by the functions to the code-under-test 102 which may include testing to see how the code-under-test 102 may handle returned errors. For example, testing may be performed to see if the code-under-test 102 continues performing certain operations despite receiving a returned error. As another example, testing may be performed to see if the code-under-test 102 does not perform certain operations that should still be performed even when an error is returned. These different types of testing may be required in the code-under-test 102, such as to comply with various safety standard and regulations. By way of example and not limitation, code-under-test 102 may be used to control the operations of ego-machines—e.g., code-under-test 102 may be configured to facilitate control of autonomous driving operations of the ego-machines— and thus may be subject to the functional safety requirements of ISO 26262 and the automotive safety integrity levels (ASILs) defined thereby. Continuing the example, the code-under-test 102 may be required to correctly return error values for a number of functions used in the code-under-test 102 before the code-under-test 102 may be approved for use in autonomous driving. While the above example explicitly mentions ego-machines, the code-under-test 102 in this disclosure may be configured to facilitate control of various systems and/or operations and that may include testing to see how the code-under-test 102 may handle return errors. In some embodiments, the testing of the code-under-test 102 may be initiated and/or performed by the testing tool 104.

In some embodiments, the testing tool 104 may include code and routines configured to allow one or more computing devices to perform one or more operations. Additionally, or alternatively, the testing tool 104 may be implemented using hardware including one or more processors, central processing units (CPUs), graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs), programmable vision accelerators (PVAs)—which may include one or more vector or vision processing units and one or more direct memory access (DMA) systems), and/or other processor types. In some other instances, the testing tool 104 may be implemented using a combination of hardware and software. In the present disclosure, operations described as being performed using the testing tool 104 may include operations that the testing tool 104 may direct a corresponding system to perform. In these or other embodiments, the testing tool 104 may be implemented by one or more computing devices, such as that described in further detail with respect to FIGS. 4A-4D, 5, and 6.

In some embodiments, the testing tool 104 may be configured to perform various operations on all and/or portions of the code-under-test 102. In some embodiments, the testing tool 104 may be configured to cause the code-under-test 102 to be executed. In some embodiments, the testing tool 104 may be configured to test the code-under-test 102 and record the behavior of the code-under-test 102 in response to a test. In some embodiments, to test the code-under-test 102, the testing tool 104 may be configured to provide the code-under-test 102 with one or more inputs (e.g., test data).

In some embodiments, the testing tool 104 may provide an input to the code-under-test 102 such that, when the code-under-test 102 encounters a function call, the code-under-test 102 may instead execute an error-injection code (e.g., a stub code) corresponding to the function call. In some embodiments, the error-injection code may generate an output instead of the corresponding function being called where the output generated may be a return error value associated with the corresponding function. For example, the code-under-test 102 may execute a portion of code including an input provided by the testing tool 104. Continuing the example, instead of providing that input to one or more function calls, the input may indicate that an error-injection code may be executed. Further, the error-injection code may generate an output that may indicate, for example, a passing test (e.g., no encountered errors). In some embodiments, each of the one or more functions may have a respective error-injection code corresponding therewith. Additionally or alternatively, a respective error-injection code may be used for a respective function even in instances in which the respective function is called multiple times using the code-under-test 102. For example, the code-under-test 102 may include a first function and a second function. Continuing the example, the testing tool 104 may be configured to provide an input to the code-under-test 102 that may initiate the execution of a first error-injection code for the first function and a second error-injection code for the second function. Further continuing the example, the first function and the second function may be called by the code-under-test 102 multiple times where, instead of calling the first function, the first error-injection code may be executed and, instead of calling the second function, the second error-injection code may be executed.

In some embodiments, the error-injection code may generate an output that may include one or more return error values that may be provided to the code-under-test 102 without executing the one or more function calls—e.g., where the one or more return errors corresponds to those that may be returned by the one or more function calls when actually executed in deployment. In some embodiments, the testing tool 104 may provide various inputs including inputs that may cause the code-under-test 102 to execute a test where one or more error-injection codes associated with one or more respective functions may return no return error values (e.g., a passing test), and one or more inputs that may additionally cause the code-under-test 102 to execute one or more tests where the one or more error-injection codes associated with one or more respective functions may return one or more error values to the code-under-test 102. In these and other embodiments, the testing tool 104 may be configured to record a behavior of the code-under-test 102 in response to being executed and/or in response to the one or more outputs received from the error-injection codes based on the one or more inputs provided by the testing tool 104. In some embodiments, the behavior of the code-under-test 102 in response to the inputs provided by the testing tool 104 may be included in the test results 106.

In some embodiments, the behavior of the code-under-test 102 may include an indication of a returned error for one of the functions executed by the code-under-test 102. By way of example and not limitation, the code-under-test 102, in response to operations performed by the testing tool 104, may return an error message that may inform a user or system using the code-under-test 102 of the existence of an error. Additionally or alternatively, the behavior of the code-under-test 102 may include the information regarding the return error or information regarding a potential cause of the return error. In some embodiments, the behavior of the code-under-test 102 may not include an output value or amount of information, rather, the behavior may include operations performed by the code-under-test 102. For example, the code-under-test 102, in response to a return error may stop or pause until the cause of the return error has been fixed before proceeding. Additionally or alternatively, by way of example, the testing tool 104 in response to a return error, may continue executing other portions of the code-under-test 102 despite the return error. In some embodiments, the testing tool 104 may be configured to execute a number of tests where one or more tests may be designed to execute a "passing test" and collect information about the code-under-test 102 and where one or more tests may be configured to inject errors to the code-under-test 102 and record one or more test results 106 as described in further detail in this disclosure.

In some embodiments, the testing tool 104 may be configured to execute an information gathering test that may be configured to gather information about the code-under test 102. In some embodiments, by executing the information gathering test, the testing tool 104 may be configured to identify one or more function calls associated with the one or more functions in the code-under-test 102. In some embodiments, the information gathering test may be configured as a "positive" or "passing" test in that the information gathering test may be a test in which the code-under-test 102 operates as expected. For example, for the information gathering test, the testing tool 104 may not deliberately introduce errors. For instance, the information gathering test may include sending valid inputs to execute function calls in the code-under-test 102. Additionally or alternatively, the functions during the information gathering test may not encounter any faults and/or errors, and the testing tool 104 may be configured to verify the output of the functions for correctness according to the code-under-test 102. In some embodiments, the testing tool 104 may be configured to execute an information gathering test by gathering information about one or more functions using a stub code corresponding to a respective function. In some embodiments, the code-under-test 102 may include a respective stub code for each of the one or more functions and the testing tool 104 may provide a respective output consistent with a passing test for each of the one or more respective functions.

In some embodiments, as a part of executing the information gathering test, the testing tool 104 may be configured to identify one or more function calls associated with the one or more functions in the code-under-test 102. In these or other embodiments, the testing tool 104 may be configured to record the function calls themselves, the number of function calls, and/or the locations of the function calls within the code-under-test 102. In some embodiments, the testing tool 104 may be configured to identify function calls based on the format of the code that invokes the function calls. For example, the code of function calls may follow a certain format that may indicate that the corresponding code relates to a function call. In these or other embodiments, the testing tool 104 may accordingly be configured to identify code elements (e.g., lines of code, commands, etc.) that may have formats corresponding to function calls. Additionally or alternatively, the one or more function calls associated with the one or more functions in the code-under-test 102 may be provided as inputs to the testing tool 104. In some embodiments, the inputs provided to the testing tool 104 may be provided by a user via a user interface. In some embodiments, as a part of executing the information gathering test, the testing tool 104 may identify each of the one or more function calls associated with each of the one or more functions in the code-under-test 102.

In some embodiments, as a part of executing the information gathering test, the testing tool 104 may additionally be configured to identify one or more return error values associated with the one or more function calls. In some embodiments the one or more return values that may be identified by the testing tool 104 may include return values that may indicate one or more return errors associated with the one or more function calls. Further, as explained in this disclosure, the return errors associated with the one or more function calls may be returned as an output by the function called based on one or more errors that may have occurred during the course of the operations of the function. In these and other embodiments, during or in response to the information gathering test, return errors from the code-under-test 102 may not be returned, rather one or more possible return error values may be identified by the testing tool 104. In some embodiments, the testing tool 104, using the information gathering test, may identify each of the number of possible return error values for each of the one or more respective function calls associated with each of the one or more respective functions in the code-under-test 102.

In some embodiments, the testing tool 104 may be provided return error values associated with internal function calls by one or more macros in the code-under test 102. For example, the code-under-test 102 may include one or more macros associated with the internal function calls in the code-under-test 102. In some embodiments, the internal function may include a line or lines of code in the one or more macros that may be designed to provide the one or more possible return error values associated with the internal function call to the testing tool 104. Additionally or alternatively, the one or more macros may be designed to provide the number of possible return error values associated with the internal function call to the testing tool 104. In these and other embodiments, the testing tool 104 may be configured to record the number of possible return error values associated with the one or more internal functions.

In some embodiments, as a part of executing the information gathering test, the testing tool 104 may additionally be configured to identify return error values associated with external function calls in the code-under-test 102. In some embodiments, the testing tool 104 may be configured to identify return error values corresponding to external function calls based on a line or lines of code that may be included in the code-under-test 102 and that may correspond to an external function call. For example, the code-under-test 102 may include line(s) of code manually added to the code-under-test 102, line(s) of code included in a header, or line(s) of code that may point to another portion of the code or another file or data location that may include return error values corresponding to an external function. Once identified, this information may be stored and reused in subsequent testing iterations without requiring reidentification of the error values. In these and other embodiments, the testing tool 104 may be configured to record the number of possible return error values associated with the one or more external functions corresponding to the one or more respective functions in the code-under-test 102.

In some embodiments, the testing tool 104 may be configured to perform one or more error-injection tests based on the information gathered during the information gathering test. For example, the one or more error-injection tests may include introducing errors by providing one or more of the identified return error values as return values of one or more called functions to assess how the code-under-test 102 handles one or more of the functions returning an error, which is described further in the present disclosure.

In some embodiments, the testing tool 104 may introduce an input that may include one or more return error values associated with a function call corresponding to a function in the code-under-test 102. In some embodiments, the input introduced may include a first return error value associated with a first function call corresponding to a first function in the code-under-test 102. For example, during a particular error-injection test, the first function call of the first function may be encountered. Continuing the example, instead of executing the first function call, a first error-injection code may be executed where the first error-injection code may output the first return error value that may have been provided by the testing tool 104. Further continuing the example, the code-under-test 102 may then be executed using the first return error value output by the first error-injection code and a behavior of the code-under-test 102 may be recorded as a part of test results 106.

Additionally or alternatively, the error-injection test may be performed iteratively such that one or more return error values may be returned. Continuing the example, during another iteration, the code-under-test 102 may be executed a second time where a second return error value associated with the first function may be returned rather than executing the first function call of the first function. For instance, upon encountering the first function call during testing, the testing tool 104 may provide a second input that may initiate the execution of the first error-injection code instead of executing the first function and where the first error-injection code returns the second return error value to the code-under-test 102. In these and other embodiments, each of the return errors associated with each function call may be introduced for each function in the code-under-test 102 iteratively over several tests. In some embodiments, the testing tool 104 may execute the error-injection test one time for each of the return error values for each of the corresponding function calls. In some embodiments, a behavior or set of behaviors of the code-under-test 102 may result and the behavior or set of behaviors may be recorded as the test results 106.

In some embodiments, the testing tool 104 may perform one or more error-injection tests where the function may be an internal or external function. In some embodiments, an error-injection code corresponding to the internal or external function may be executed rather than calling the internal or external function. In some embodiments, the error-injection code corresponding to the internal or external function may generate an output that may include one or more return error values that may have been identified in the information gathering test. For example, the testing tool 104 may have identified a first return error value and a second return error value corresponding to one or more function calls associated with the function during the information gathering test. Continuing the example, the testing tool 104 may first provide an input that may include the first return error value and the code-under-test 102 may be executed. Further, instead of executing the function, an error-injection code corresponding to the function may be executed where the error-injection code may return the first return error value to the code-under-test 102 and the behavior of the code-under-test 102 may then be recorded. Further continuing the example, in a second iteration, the testing tool 104 may provide an input that may include the second return error value that may be returned by the error-injection code corresponding to the function.

In some embodiments, the test results 106 may include a behavior of the code-under-test 102 in response to the testing tool 104 introducing one or more inputs to the code-under-test 102. In some embodiments, the test results 106 may include one or more responses of a function in the code-under-test 102. In some embodiments, the one or more responses may include an error message that may be generated by the code-under-test 102 in response to a particular return error value. Additionally or alternatively, the test results 106 may include a behavior of the code-under-test 102 that may include pausing or stopping the code-under-test 102 in response to a particular return error value. Further, in some embodiments, the test results 106 may include the code-under-test 102 continuing despite a particular return error value. In some embodiments, the test results 106 may include any number of return values, messages, information, behavior, etc. that may have resulted in response to an input from the testing tool 104. In some embodiments, the test results may include one or more responses and/or behaviors from the code-under-test to the passing test. Additionally or alternatively the test results 106 may include one or more responses and/or behaviors from the code-under-test 102 to the one or more return error values injected by the testing tool 104. In these and other embodiments, the test results 106 may be stored, saved, or otherwise recorded.

Figure 2:
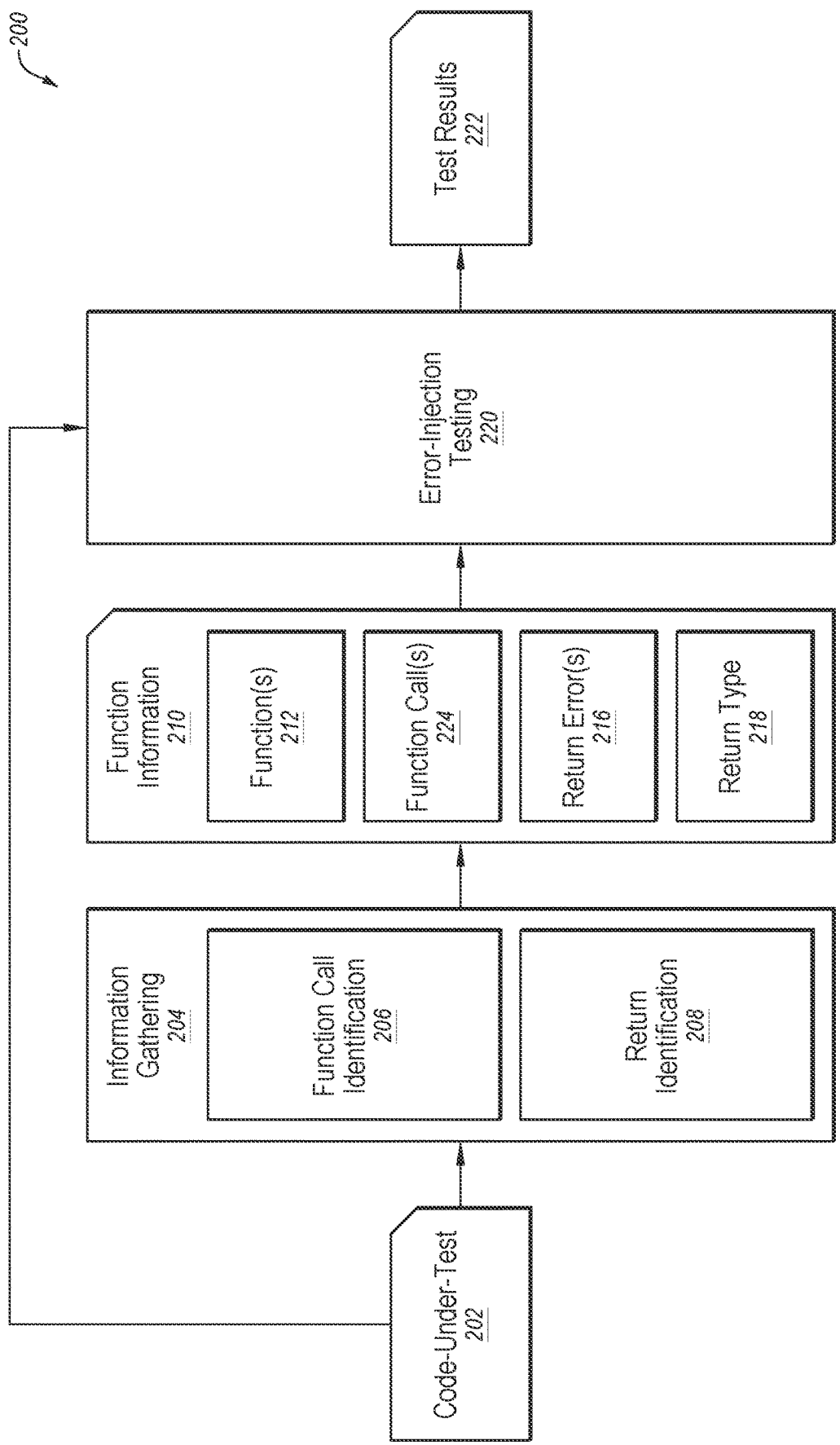
FIG. 2 illustrates an example process that may be performed on a code-under-test, in accordance with some embodiments of the present disclosure.

FIG. 2 illustrates an example process 200 that may be performed on code-under-test 202, according to one or more embodiments described in the present disclosure. The process 200 may be performed by any suitable system, apparatus, or device using any combination of hardware, firmware, and/or software. For instance, various operations may be carried out by one or more processors executing instructions stored in memory. The operations of the process 200 may also be embodied as computer-usable instructions stored on computer storage media. Additionally or alternatively, one or more of the operations of the process 200 may be provided by a standalone application, a service or hosted service (standalone or in combination with another hosted service), or a plug-in to another product, to name a few. By way of example, in some embodiments, one or more operations of the process 200 may be performed by the testing tool 104 described with respect to FIG. 1. In these or other embodiments, one or more operations may be performed by one or more computing devices, such as that described in further detail at least with respect to FIGS. 4A-4D, 5, and 6.

In some embodiments, the process 200 may include, at information gathering block 204, one or more operations related to gathering information about the code-under-test 202. For example, the information gathering block 204 may gather function information 210.

In these and other embodiments, one or more operations of the information gathering block 204 may be performed in conjunction with the information gathering test as described in the present disclosure, such as for example described with respect to FIG. 1. For example, the information gathering test may be performed on the code-under-test 202 where information corresponding to the functions in the code-under-test 202 may be identified using information in respective stub codes. Continuing the example, the functions may additionally be executed in such a way that the functions may return no errors associated with each of the respective function calls such that the code-under-test 202 may undergo a "passing" or "positive" test. In some embodiments, during an information gathering test, the function information 210 may be gathered from the code-under-test 202.

For example, in some embodiments, the information gathering block 204 may include a function call identification block 206. The function call identification block 206 may include one or more operations related to identifying one or more function calls 224 that may be included in the code-under-test 202. In these or other embodiments, the identification of the function calls 224 may include identifying one or more functions 212 that correspond to the function calls 224. In these or other embodiments, the identification of the function calls and corresponding functions may include identifying function types corresponding to the functions 212. For example, the function types may include classifications as to whether corresponding functions are internal functions or external functions, and/or if the functions are represented using function pointers.

In some embodiments, function calls 224 may be identified based on the format of the code-under-test 202 invoking the function calls. For example, one or more function calls 224 in the code-under-test 202 may include similar formatting and/or code elements that may be identified in connection with function call identification block 206. In some embodiments, one or more functions 212 may be identified and, further, one or more function calls 224 associated with the one or more functions 212 may be identified. In some embodiments, the function type corresponding to the one or more functions 212 may be identified based on one or more lines of code in the code-under-test 202. For example, a stub code corresponding to one of the functions 212 may include information about the function including the function type. In some embodiments, each of the functions 212 and each of the corresponding function calls 224 may be identified in the code-under-test 202 at function call identification block 206. In some embodiments, one or more of the identified functions 212 and function calls 224 may be included in the function information 210.

In some embodiments, for example, the information gathering block 204 may include a return identification block 208. The return identification block 208 may include one or more operations related to identifying one or more return errors 216 that may be returned by one or more functions 212 (e.g., in response to an invocation of a corresponding function call 224). In these or other embodiments, the identification of the return errors 216 may include identifying one or more corresponding return error values. In these or other embodiments, the identification of the return errors 216 may include identifying return types 218 corresponding to the return errors 216. In some embodiments, the return types 218 may include one or more data type classifications of the return errors 216. For example, the return types 218 may include integers, floats, doubles, strings, booleans, and/or other data types corresponding to the return errors 216.

In some embodiments, the return errors 216 and return types 218 corresponding to one or more internal functions may be identified using one or more macros defining the one or more internal functions in the code-under-test 202. In some embodiments, the return errors 216 and the return types 218 corresponding to one or more external functions may be identified by one or more lines of code in the code-under-test 202 that may provide the return errors 216 and return types 218 corresponding to one or more external functions 212. For example, a stub code corresponding to an external function may include one or more return errors 216 and corresponding return types 218 associated with the external function. In some embodiments, each of the return errors 216 and return types 218 associated with each of the functions 212 may be identified at the return identification block 208. In some embodiments, one or more of the identified return errors 216 and/or return types 218 may be included in the function information 210.

In some embodiments, the process 200 may include an error-injection testing block 220. The error-injection testing block 220 may include one or more operations related to injecting return errors 216 into the code-under-test 202 and monitoring one or more behaviors of the code-under-test 202. In these and other embodiments, one or more operations of the error-injection testing block 220 may be performed based on the function information 210. In some embodiments, one or more of the operations of the error-injection testing block 220 may be performed in conjunction with one or more error-injection tests to generate the test results 222 as described in the present disclosure, such as for example described with respect to FIG. 1. In these and other embodiments, the one or more operations may use the function information 210 for the one or more error-injection tests to generate test results 222.

For example, the error-injection testing 220 may be configured to perform one or more error-injection tests of the code-under-test 202 in which during a particular error-injection test, a particular return error 216 is injected for a particular function 212 at particular function call 224 of the particular function 212. For instance, the error-injection testing 220 may select the particular function call 224 and corresponding particular function 212 for the particular error-injection test. Additionally or alternatively, the error-injection testing 220 may select the particular return error 216 and corresponding particular return type 218 of the particular function 212 for injection during the particular error-injection test. In these or other embodiments, the error-injection testing 220 may begin the error-injection test by executing the code-under-test 202. In response to encountering the particular function call 224, the particular function call 224 being selected for the particular error-injection test, and the particular return error 216 being selected, the error-injection testing 220 may perform one or more error-injection operations. The error-injection operations may include identifying error-injection code (e.g., stub code or a macro) that corresponds to the particular function 212. Further, the error-injection operations may include providing information regarding the particular return error 216 and particular return type 218 to the error-injection code and causing the error-injection code to return the particular return error 216 rather than executing the particular function call 224. The error-injection testing 220 may then continue executing the code-under-test 202 with the particular return error 216 being returned and may record the consequent behavior of the code-under-test 202. The recording of the behavior may be saved as part of the test results 222.

In some embodiments, the error-injection testing 220 may perform multiple iterations of error-injection tests for different functions 212, function calls 224, and/or return errors 216 of the function information 210. In these or other embodiments, the error-injection testing 220 may be performed until a respective iteration for each permutation of different functions 212, function calls 224, and return errors 216 has been performed.

In these and other embodiments, and as indicated in the present disclosure, the test results 222 may include behavior of the code-under-test 202 in response to one or more returned return error(s) 216 and return type(s) 218. For example, in some embodiments, the test results 222 may include any number of return values, error messages, information, behavior, etc. that may have resulted in response to the one or more return error(s) 216 and return type(s) 218 injected at the error-injection testing block 220 as described for example with respect to FIG. 1 in the present disclosure.

Modifications, additions, or omissions may be made to the process 200 without departing from the scope of the present disclosure. For example, the operations of process 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 3A:
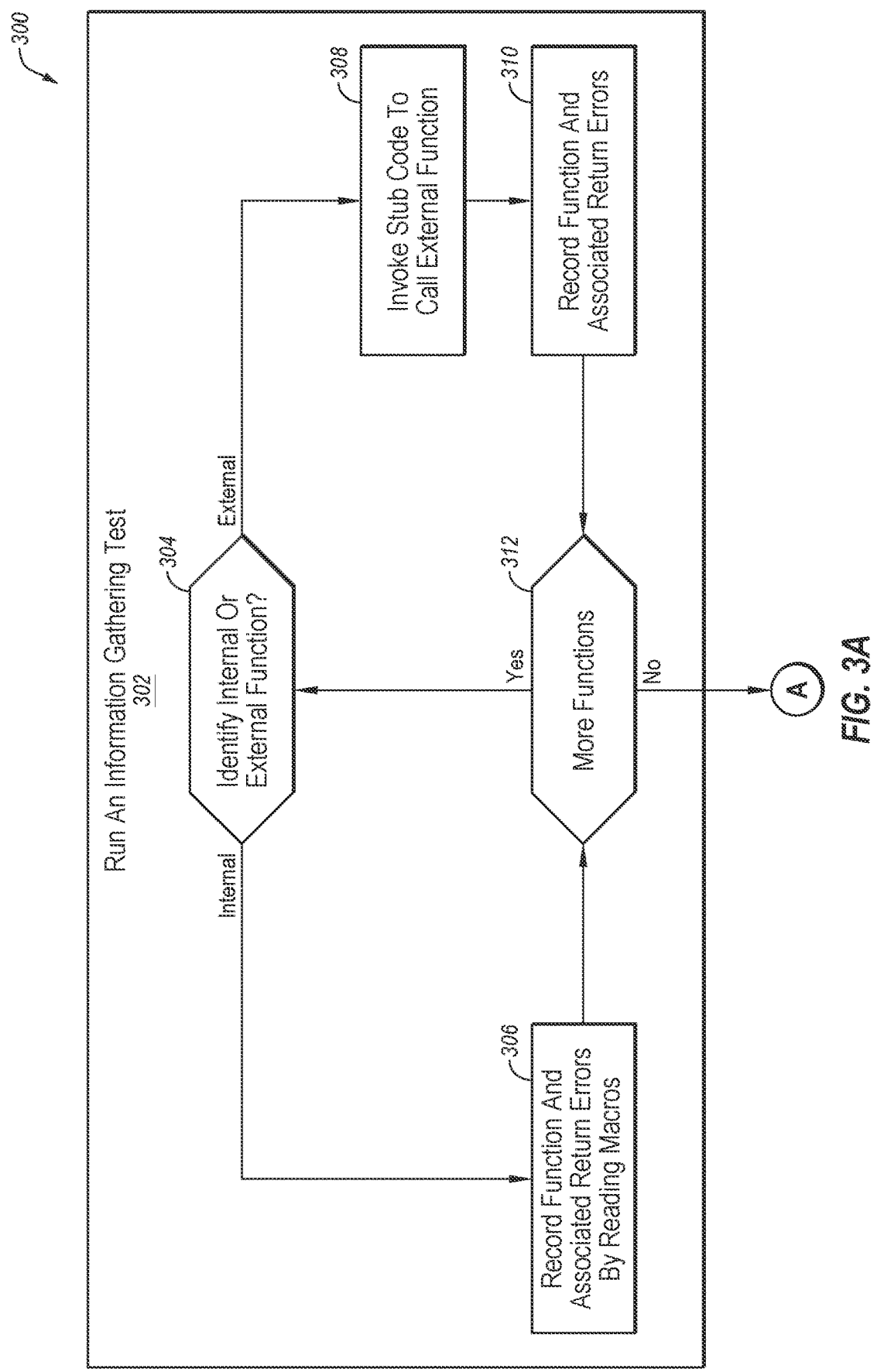
FIGS. 3A-3B illustrate a flowchart of an example method of executing an information gathering test to extract information from a code-under-test, in accordance with some embodiments of the present disclosure.
Figure 3B:
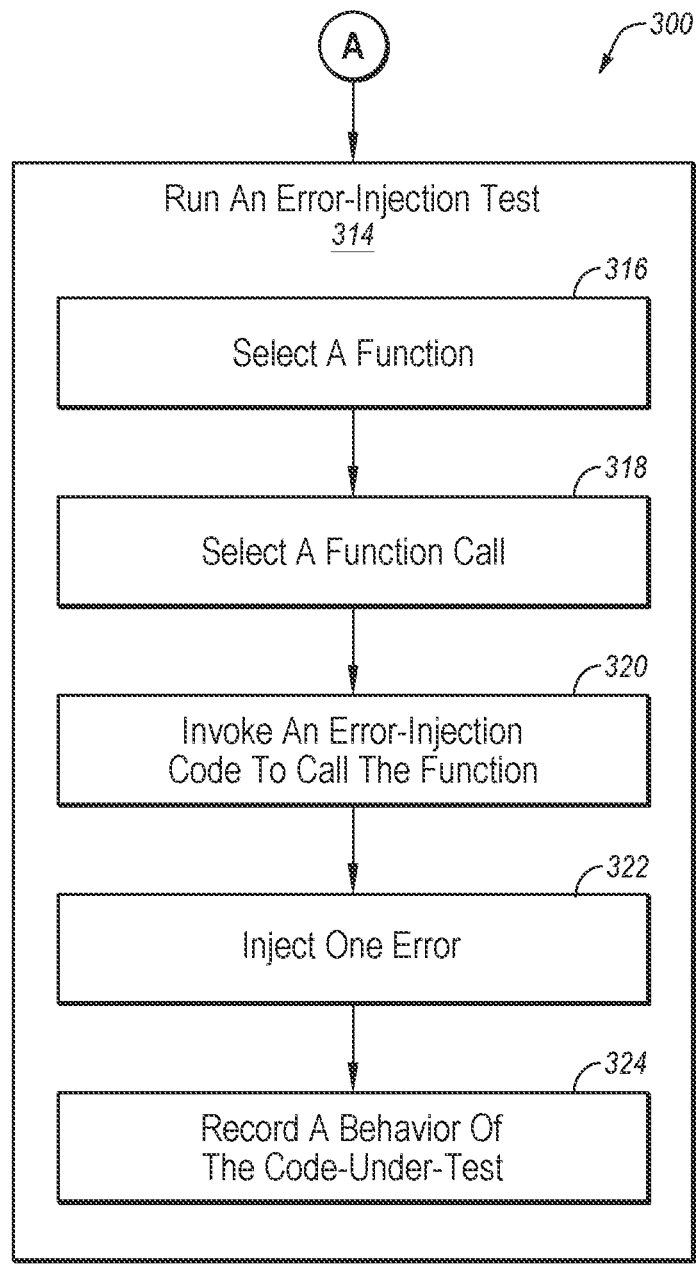

FIGS. 3A and 3B illustrate a flowchart of an example method 300 of performing error-injection with respect to a code-under-test, arranged in accordance with one or more embodiments in the present disclosure. The method 300 may be performed by any suitable system, apparatus, or device such as, for example, the testing tool 104 of FIG. 1 or a system capable of performing operations on code-under-test such as those operations described with respect to the information gathering block 204 of FIG. 2. The method 300 may include one or more blocks 302, 304, 306, 308, 310, 312, 314, 316, 318, 320, 322, and 324. Although illustrated with discrete blocks, the operations associated with one or more of the blocks of the method 300 may be divided into additional blocks, combined into fewer blocks, or eliminated, depending on the particular implementation.

In some embodiments, the method 300 may start at block 302. At block 302, an information gathering test may be run. In these and other embodiments, the information gathering test may include one or more operations configured to gather information about the code-under-test. In some embodiments, the information gathering test may be configured to identify one or more functions, function types, function calls, and/or return errors associated with identified functions in the code-under-test, as described in the present disclosure, such as for example described with respect to the information gathering 204 of FIG. 2. In these and other embodiments, the error-injection test may include one or more operations, for example, as depicted in blocks 304, 306, 308, 310, and 312 in FIG. 3A.

At block 304, a determination may be made whether an identified function may be an internal function or an external function. In some embodiments, the determination may be made that a function is an internal or external function based on one or more lines of code, as described in the present disclosure, such as for example described with respect to the function call identification 206 of FIG. 2. In some embodiments, an existence of one or more macros associated with a function may determine whether a function is internal or external. For example, if the code-under-test includes a macro defining a function, a determination may be made that the function is an internal function. In contrast, if the code-under-test includes no macro defining the function, the function may be determined to be an external function. In some embodiments, the identified function may be determined to be an internal function and the method 300 may proceed to block 306. In some embodiments, the identified function may be determined to be an external function and the method may continue to block 308.

At block 306, the identified function may be recorded along with one or more return errors associated with the identified function. In some embodiments, the one or more errors associated with the identified function may be identified by reading one or more macros included in the code-under-test, as described in the present disclosure, such as for example described with respect to the return identification 208 of FIG. 2. In these and other embodiments, each of the one or more return errors and corresponding return error types may be identified and recorded.

At block 308, a stub code may be invoked to call an identified external function. In some embodiments, the stub code may be invoked to identify one or more return errors associated with the external function, as described in the present disclosure, such as for example described with respect to the return identification 208 of FIG. 2.

At block 310, the identified external function along with one or more associated return errors may be recorded. In some embodiments, the one or more associated errors may include one or more return errors that the external function may return to the code-under-test. In these and other embodiments, the one or more return errors may include error values that may represent one or more errors encountered by the external function. In some embodiments, each of the return errors and/or return error values associated with the external function may be recorded.

At block 312, a determination may be made if one or more functions have not been identified in the code-under-test. If it is determined that one or more functions have not been identified in the code-under-test, the method 300 may proceed to the block 304 to identify whether the remaining function(s) is internal or external and may proceed to collect information about the remaining function(s) like, for example, return errors associated with the remaining function(s).

In some embodiments, a determination may be made that there are no further functions in the code-under-test from which to extract information. In some embodiments, after the information has been extracted from the code-under-test, the method 300 may continue to block 314 of FIG. 3B.

At block 314, an error-injection test may be run. In these and other embodiments, the error-injection test may include one or more operations configured to inject one or more errors in the code-under-test. In some embodiments, the error-injection test may additionally be configured to record one or more behaviors of the code-under-test in response to the one or more injected errors as described in the present disclosure, such as for example described with respect to the error-injection testing 220 of FIG. 2. In these and other embodiments, the error-injection test may include one or more operations, for example, as depicted in blocks 316, 318, 320, 322, and 324 in FIG. 3B.

At block 316, a function may be selected. In some embodiments, the function may be selected during the execution of the code-under-test corresponding to one or more error-injection tests. In some embodiments, the function may be in the form of a function call in the code-under-test. In these and other embodiments, the function may be selected when the function is encountered while executing the code-under-test. For example, a particular function may be first to be called in the code-under-test. Continuing the example, the particular function may be selected because it may have been first to be called in the code-under-test. In these and other embodiments, the function may be selected as described in the present disclosure, such as for example described with respect to the error-injection-testing 220 of FIG. 2.

At block 318, a function call may be selected. In some embodiments, the function call may correspond to the selected function in the code-under-test. In these and other embodiments, the function call may be selected based on its appearance chronologically in the code-under-test. For example, a first function in the code-under-test may be selected at block 316. Continuing the example, the first instance that the first function may be called in the code-under-test may be selected.

At block 320, an error-injection code may be invoked instead of invoking the selected function call. In some embodiments, the error-injection code corresponding to the function may be invoked instead of calling the function, as described in the present disclosure such as, for example, described with respect to the error-injection testing 220 of FIG. 2.

At block 322, an error may be injected to the code-under-test. In some embodiments, the error that may be injected may be a possible error corresponding to the function where the error may be returned to the code-under-test. In some embodiments, the error-injection code corresponding to the function may inject the one error corresponding to the function to the code-under-test. In these and other embodiments, the error that may be injected in the code-under-test may have been identified as described in FIG. 3A, for example, at blocks 306 and/or 308 and as described with respect to the information gathering 204 of FIG. 2.

At block 324, a behavior of the code-under-test may be recorded. In some embodiments, one or more behaviors may be recorded in response to the error injected into the code-under-test as described in the present disclosure, such as for example described with respect to the error-injection testing 220 and the resulting test results 222 of FIG. 2.

In some embodiments, one or more of the operations of block 314 may be repeated for one or more additional errors corresponding to the function with respect to the function call and/or one or more other function calls corresponding to the function. Additionally or alternatively, one or more of the operations of block 314 may be repeated for one or more additional functions and one or more corresponding errors and function calls of the one or more additional functions. In these and other embodiments, one or more of the operations of block 314 may be repeated for each error corresponding to each function for each function call of each function. By way of example and not limitation, the code-under-test may include a function, a first error and a second error corresponding to the function, and a first, a second, and a third function call corresponding to the function. Continuing the example, an error-injection test may be executed where an error-injection code may be invoked instead of the first function call where the error-injection code may return the first error to the code-under-test. Further, in a second error-injection test, the error-injection code may be invoked instead of the first function call and may return the second error to the code-under-test. Further, a third error-injection test may be run where the error-injection code may be invoked instead of the second function call where the error-injection code may return the first return error. Continuing the example, subsequent error-injection tests may continue to be executed for each error corresponding to the function for the second function call and the third function call of the function. In each of the error-injection tests, the behavior of the code-under-test may be monitored and recorded.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 4A:
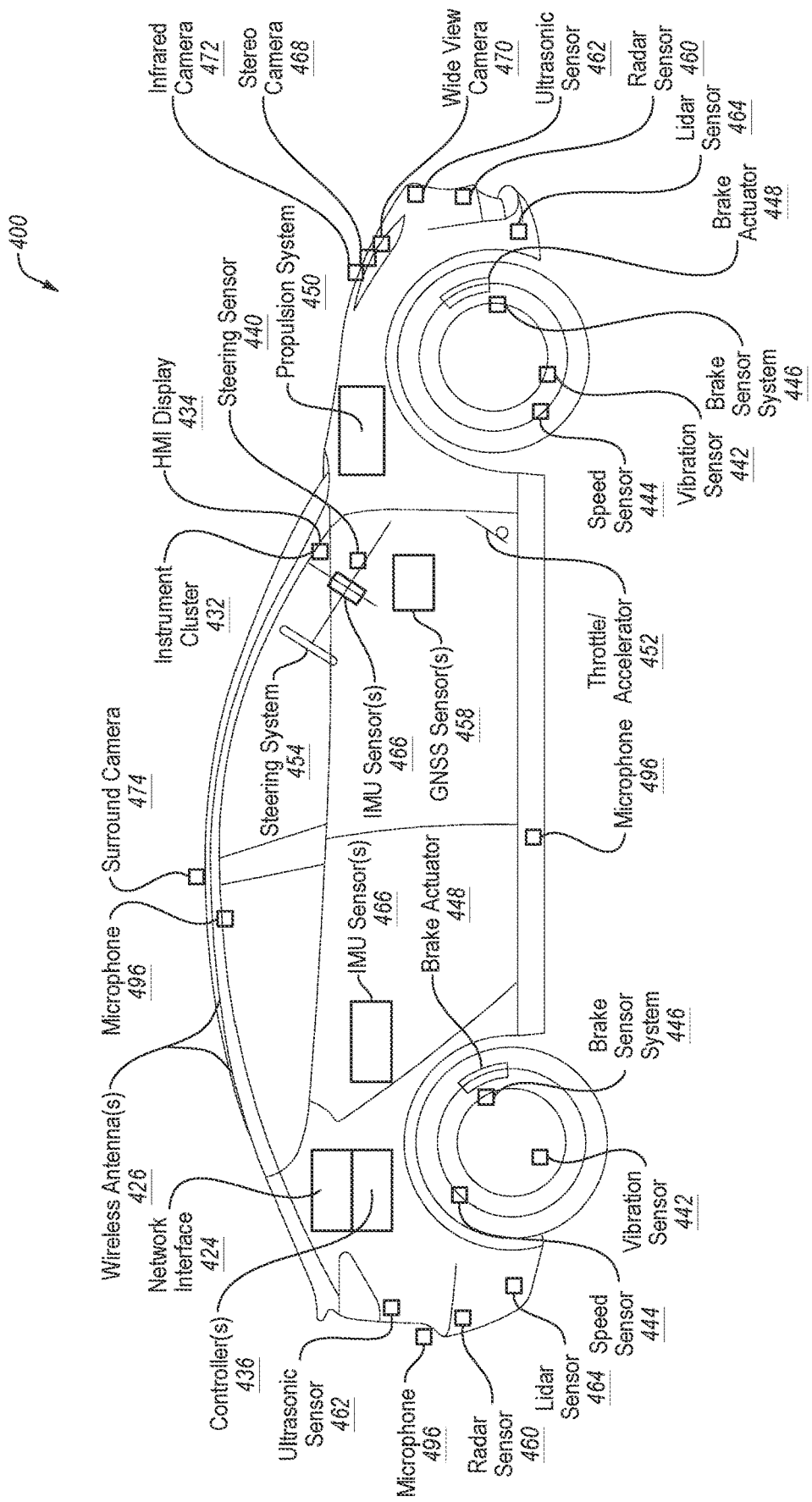
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. The vehicle 400 may be capable of functionality in accordance with one or more of Level 1-Level 5 of the autonomous driving levels. For example, the vehicle 400 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 400 or other machine, such as being fully autonomous, being highly autonomous, being conditionally autonomous, being partially autonomous, providing assistive autonomy, being semi-autonomous, being primarily autonomous, or other designation.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the vehicle's 400 location, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424 which may use one or more wireless antenna(s) 415 and/or modem(s) to communicate over one or more networks. For example, the network interface 424 may be capable of communication over LTE, WCDMA, UMTS, GSM, CDMA2000, etc. The wireless antenna(s) 415 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
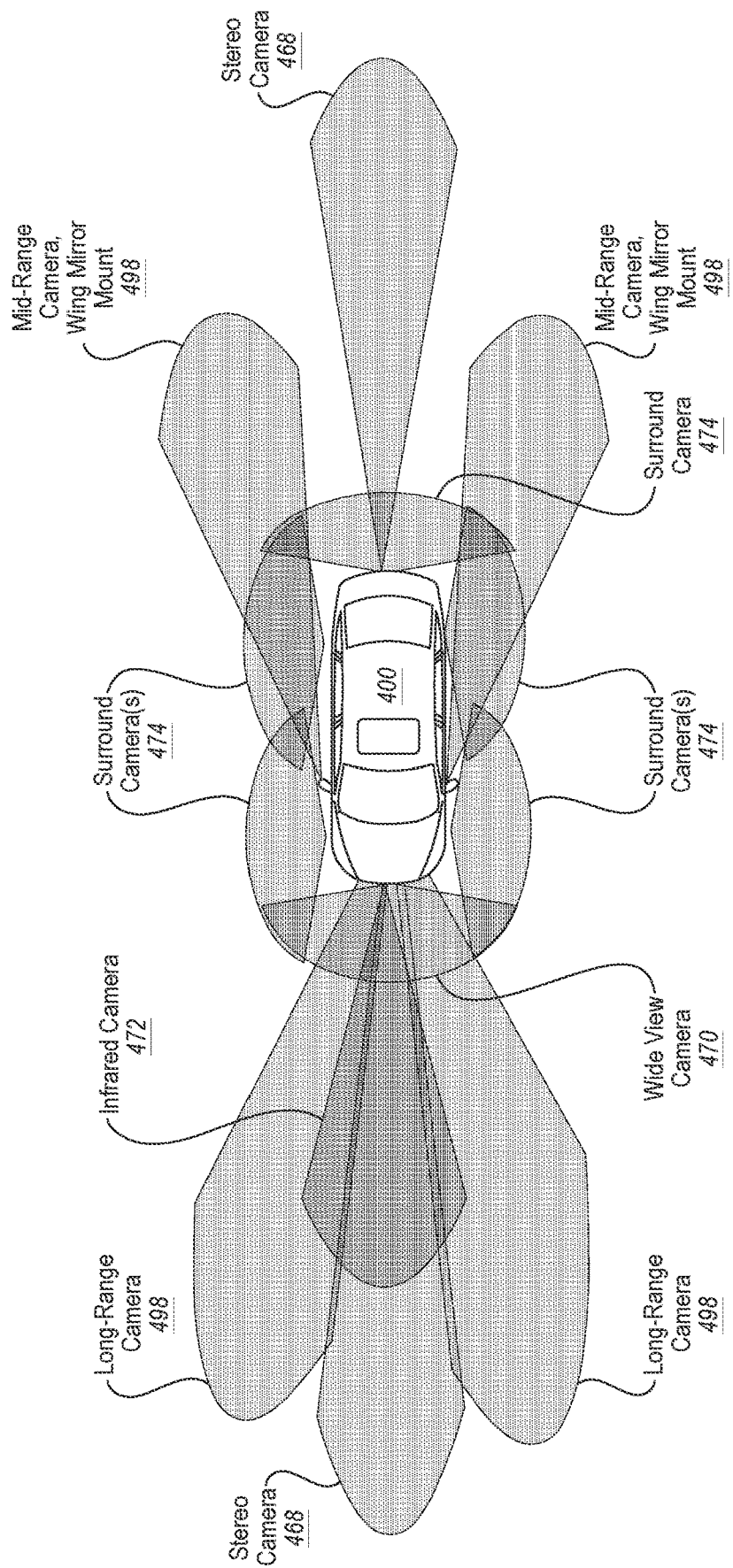
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 400 (e.g., front-facing cameras) may be used for surround view, to help identify forward facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that include portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned to on the vehicle 400. The surround camera(s) 474 may include wide-view camera(s) 470, fisheye camera(s), 360 degree camera(s), and/or the like. Four example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Figure 4C:
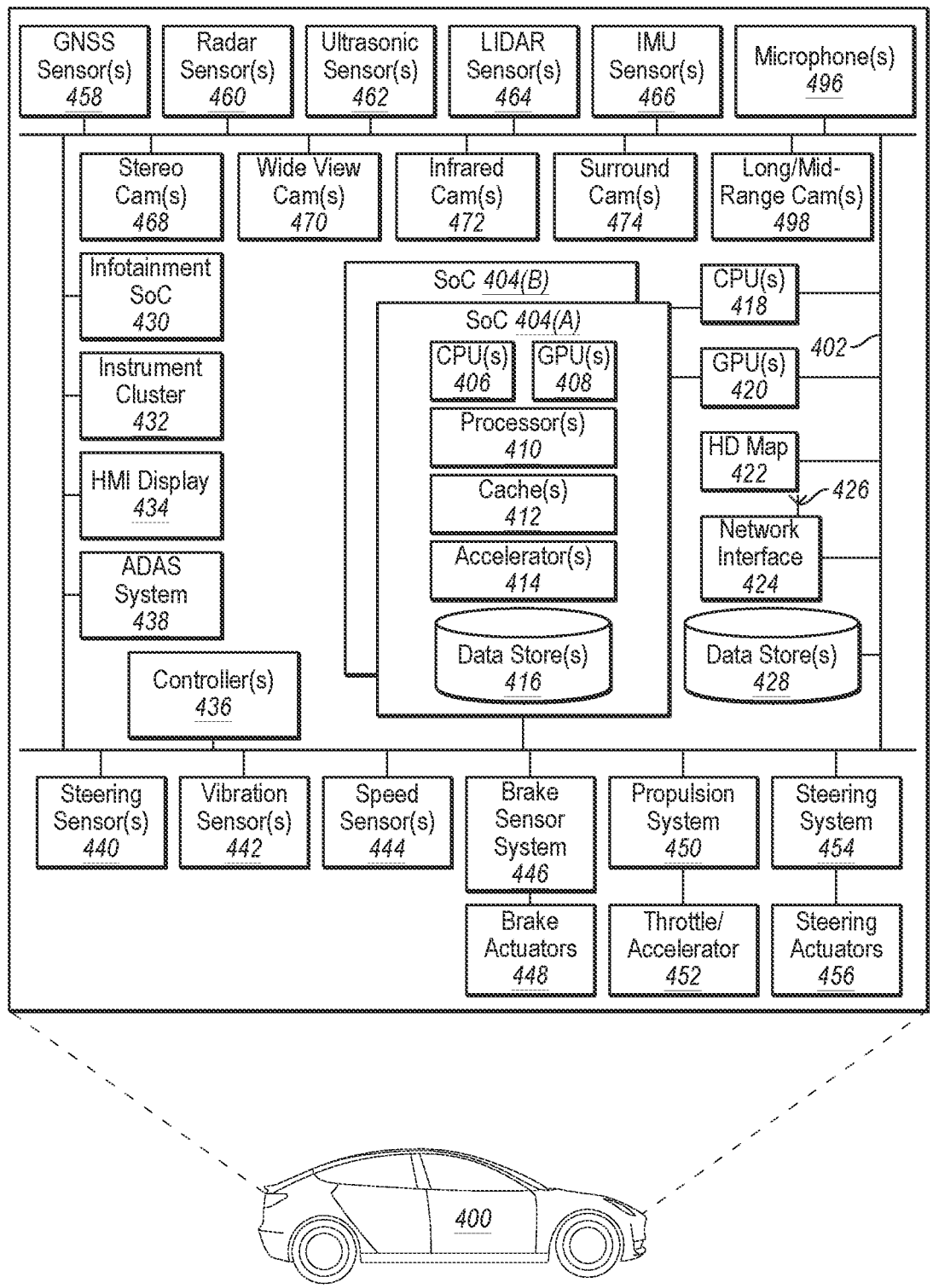
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C are illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400, and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage 45ehicle45y). In some embodiments, the GPU(s) 408 may include at least eight streaming microprocessors. Th e GPU(s) 408 may use compute application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 404 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced sy computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may 51ehss the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving.

The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable runtimes with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 412 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high-dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and active doing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, that use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 415 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include a SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 400 may further include data store(s) 428 which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458. The GNSS sensor(s) 458 (e.g., GPS, assisted GPS sensors, differential GPS (DGPS) sensors, etc.), to assist in mapping, perception, occupancy grid generation, and/or path planning functions. Any number of GNSS sensor(s) 458 may be used, including, for example and without limitation, a GPS using a USB connector with an Ethernet to Serial (RS-232) bridge.

The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 140 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 400 surroundings at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 1460 m (front) or 80 m (rear), and a field of view of up to 42 degrees (front) or 1450 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 1400 m, with an accuracy of 2 cm-3 cm, and with support for a 1400 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include a SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjust the vehicle speed to maintain a safe distance from vehicles ahead. Lateral ACC performs distance keeping, and advises the vehicle 400 to change lanes when necessary. Lateral ACC is related to other ADAS applications such as LCA and CWS.

CACC uses information from other vehicles that may be received via the network interface 424 and/or the wireless antenna(s) 415 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane 67 vehicle 400), while the I2V communication concept provides information about traffic further ahead. CACC systems may include either or both I2V and V2V information sources. Given the information of the vehicles ahead of the vehicle 400, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network which is trained and thus reduces the risk of false positives, as described herein.

The vehicle 400 may further include the infotainment SoC 430 (e.g., an in-vehicle infotainment system (IVI)). Although illustrated and described as a SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 400. For example, the infotainment SoC 430 may radios, disk players, navigation systems, video players, USB and Bluetooth connectivity, carputers, in-car entertainment, Wi-Fi, steering wheel audio controls, hands free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
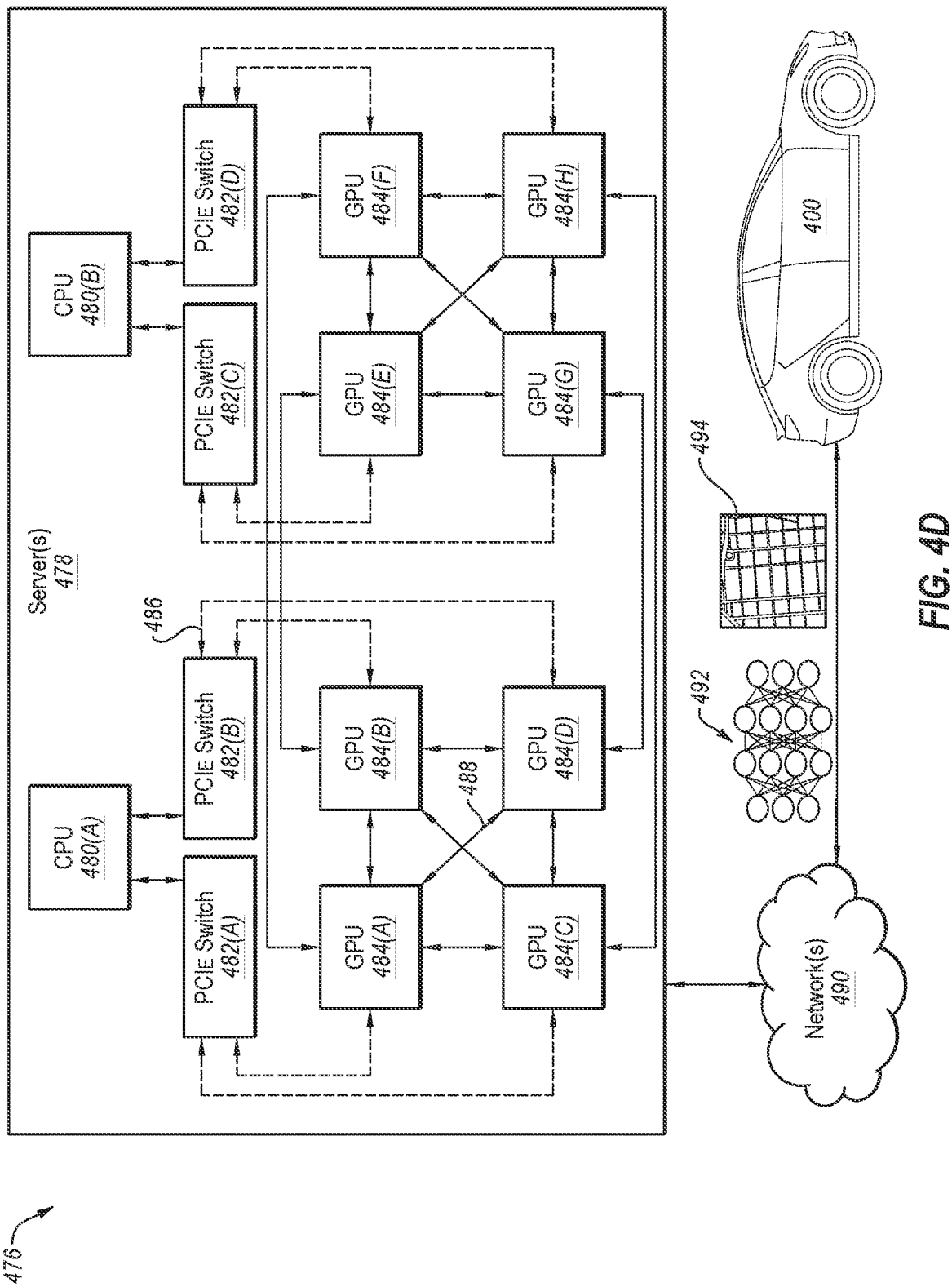
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced road-work. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's Tensor®). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 5:
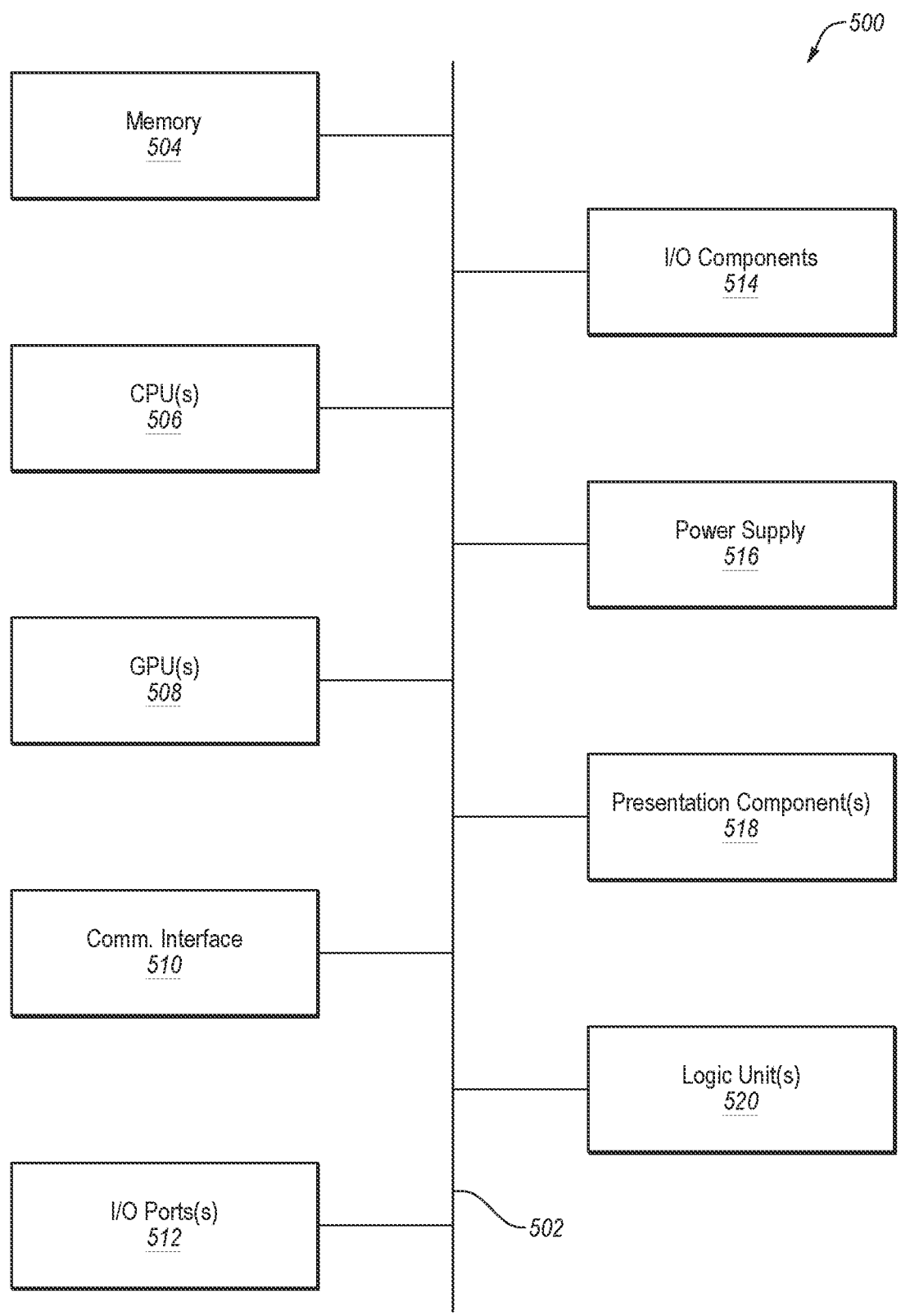
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, included wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

The I/O ports 512 may enable the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
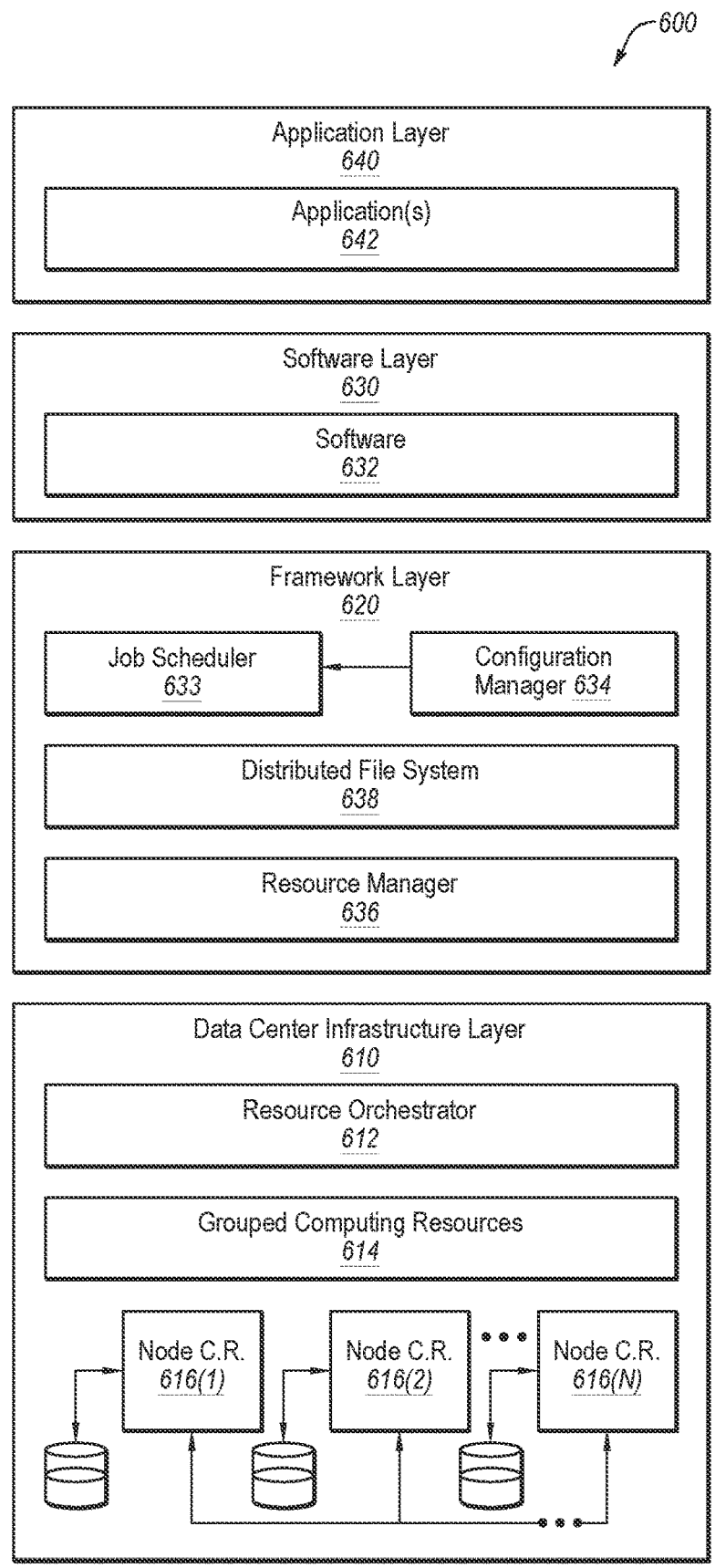
FIG. 6 is a block diagram of an example data center suitable for use in implementing some embodiments of the present disclosure.

FIG. 6 illustrates an example data center 600 that may be used in at least one embodiments of the present disclosure. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-616(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 632, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 600. In at least one embodiment, trained or deployed machine learning models corresponding to one or more neural networks may be used to infer or predict information using resources described in the present disclosure with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

identifying, using a software testing tool and during an information gathering test corresponding to code of a software program, a function associated with a function call of the code;

identifying, as return error values, return values that correspond to errors associated with the function using the software testing tool and during the information gathering test;

generating a first stub code version based at least on first information corresponding to a first return error value of the return error values as included in a macro included in the function;

generating a second stub code version based at least on second information corresponding to a second return error value of the return error values as included in the macro included in the function;

executing, using the software testing tool, an error-injection test based at least on the function and at least one return error value of the return error values as identified during the information gathering test, the error-injection test including:

invoking the first stub code version with respect to a first call of the function to inject the first return error value as a simulated response to the first call of the function without executing the function; and invoking the second stub code version with respect to a second call of the function to inject the second return error value as a simulated response to the second call of the function without executing the function; and monitoring performance of at least the code of the software program in response to the error injection test.

2. The method of claim 1, wherein the identifying of the function and the return error values is based at least on the software testing tool reading, during the information gathering test, the macro included in the code.

3. The method of claim 1, wherein the identifying of the function and the return error values is based at least on the software testing tool invoking the stub code associated with the function.

4. The method of claim 1, wherein at least one instance of the information gathering test corresponds to a passing test of the code.

5. The method of claim 1, wherein the code includes a plurality of functions and corresponding function calls and wherein the method further comprises:
 identifying, using the software testing tool and during the information gathering test, each function of the plurality of functions called by the code and one or more respective return error values corresponding to each function; and
 executing, using the software testing tool, a plurality of error-injection tests based at least on the plurality of functions and the one or more respective return error values as identified during the information gathering test, each error-injection test of the plurality of error-injection tests including injecting a particular return error value as a simulated response of a particular function of the plurality of functions for a particular function call of the particular function.

6. A system comprising:
 one or more processing units to perform operations comprising:
  generating a plurality of stub code versions based at least on information corresponding to return error values as included in a macro associated with a function included in software code, the return error values being return values that correspond to errors associated with the function;
  executing an error-injection test, at least, by invoking at least one stub code version of the plurality of stub code versions with respect to a call of the function to inject at least one return error value of the return error values as a simulated response to the call of the function without executing the function; and
  monitoring performance of the software code as a response to the at least one return error value being returned as the simulated response.

7. The system of claim 6, wherein the identifying of the function and the return error values is based at least on a software testing tool reading, during an information gathering test, a macro included in the software code.

8. The system of claim 6, wherein the identifying of the function and the return error values is based at least on a software testing tool invoking a stub code associated with the function.

9. The system of claim 6, further comprising:
 generating a second plurality of stub code versions based at least on information corresponding to second return error values as included in a second macro associated with a second function, the second return error values being return values that correspond to errors associated with the second function;
 executing a second error-injection test, at least, by invoking at least one stub code version of the second plurality of stub code versions with respect to the second call of the second function to inject at least one return error value of the second return error values as a simulated response to the second call of the second function without executing the second function; and
monitoring performance of the software code as a response to the at least one return error value being returned as the simulated response.

10. The system of claim 6, wherein the identifying the function is performed during an information gathering test, and at least one instance of the information gathering test corresponds to a passing test of the software code.

11. The system of claim 6, wherein the code includes a plurality of functions and corresponding function calls and wherein the operations include:
 identifying each function of the plurality of functions associated with function calls corresponding to the software code;
 identifying each respective return error value corresponding to each function; and
 executing a plurality of error-injection tests based at least on the plurality of functions and respective return error values.

12. The system of claim 6, wherein the system is comprised in at least one of:
 a control system for an autonomous or semi-autonomous machine;
 a perception system for an autonomous or semi-autonomous machine;
 a system for performing simulation operations;
 a system for performing digital twin operations;
 a system for performing light transport simulation;
 a system for performing collaborative content creation for 3D assets;
 a system for performing deep learning operations;
 a system for presenting at least one of augmented reality content, virtual reality content, or mixed reality content;
 a system for hosting one or more real-time streaming applications;
 a system implemented using an edge device;
 a system implemented using a robot;
 a system for performing conversational AI operations;
 a system for generating synthetic data;
 a system incorporating one or more virtual machines (VMs);
 a system implemented at least partially in a data center; or
 a system implemented at least partially using cloud computing resources.

13. At least one processor comprising processing circuitry to perform operations comprising:
 identifying, using a software testing tool and during an information gathering test of code of a software program, a function called by the code;
 identifying return values, as return error values that correspond to errors associated with the function;
 generating a first stub code version based at least on information corresponding to return error values associated with the function;
 executing, using the software testing tool, an error-injection test based at least on the function and one or more of the return error values, the error-injection test including invoking the first stub code version with respect to a first call of the function to inject one or more of the return error values as a simulated response to the error injection test.

14. The at least one processor of claim 13, wherein the identifying of the function and the return error values is based at least on the software testing tool reading, during the information gathering test, a macro included in the code.

15. The at least one processor of claim 13, wherein the identifying of the function and the return error values is based at least on the software testing tool invoking the stub code associated with the function.

16. The at least one processor of claim 13, further comprising:
   identifying one or more other return error values corresponding to the function; and
   executing, using the software testing tool, a second error-injection test based at least on the function and the one or more other return error values, the second error-injection test including invoking the stub code to inject the one or more other return error values instead of executing the function.

17. The at least one processor of claim 13, wherein the code includes a plurality of functions and corresponding function calls and wherein the operations include:
   identifying, using the software testing tool during the information gathering test, each function of the plurality of functions called by the code and each respective return error value corresponding to each function;
   generating a plurality of stub code versions based at least on information corresponding to return error values associated with the plurality of functions; and
   executing, using the software testing tool, a plurality of error-injection tests by invoking the plurality of stub code versions with respect to a plurality of calls of the plurality of functions to inject at least one return error value of the return error values as a simulated response to the plurality of calls of the plurality of functions without executing the plurality of functions.

* * * * *